US009783444B2

(12) United States Patent
Burke

(10) Patent No.: US 9,783,444 B2
(45) Date of Patent: Oct. 10, 2017

(54) REMOVAL AND RECOVERY OF PHOSPHATE FROM LIQUID STREAMS

(71) Applicant: Dennis A. Burke, Olympia, WA (US)

(72) Inventor: Dennis A. Burke, Olympia, WA (US)

( * ) Notice: Subject to any disclaimer, the term of this patent is extended or adjusted under 35 U.S.C. 154(b) by 0 days.

(21) Appl. No.: 14/999,375

(22) Filed: Apr. 29, 2016

(65) Prior Publication Data

US 2016/0251248 A1   Sep. 1, 2016

Related U.S. Application Data

(62) Division of application No. 14/545,572, filed on May 21, 2015, now Pat. No. 9,328,006.

(Continued)

(51) Int. Cl.
   *C02F 1/20*  (2006.01)
   *C02F 1/52*  (2006.01)
   (Continued)

(52) U.S. Cl.
   CPC ............... *C02F 9/00* (2013.01); *C01B 21/087* (2013.01); *C01C 1/28* (2013.01); *C02F 1/20* (2013.01);
   (Continued)

(58) Field of Classification Search
   CPC .. C02F 9/00; C02F 1/5236; C02F 1/24; C02F 1/20; C02F 3/1215; C02F 3/308;
   (Continued)

(56) References Cited

U.S. PATENT DOCUMENTS 6,893,572 B2   5/2005  Burke
7,371,328 B1 *  5/2008  Hokanson ............... A01C 3/02
                                              210/705

(Continued)

FOREIGN PATENT DOCUMENTS

KR   10-2008-0004441 A  *  1/2008

OTHER PUBLICATIONS

Jenkins, Calcium Phosphate Precipitation at Slightly Alkaline pH Values, Journal WPCF, vol. 45, No. 4, Apr. 1973, p. 627.

(Continued)

*Primary Examiner* — Fred Prince
(74) *Attorney, Agent, or Firm* — Brian J. Coyne

(57) ABSTRACT

An economical method for recovering phosphate or phosphate and nitrogen from liquid streams. A liquid containing phosphate is introduced into a culture of autotrophic microorganisms in the presence of natural or artificial light, thereby producing a liquid effluent with elevated pH and reduced alkalinity. The alkalinity is reduced through the consumption of bicarbonate/carbonate by the autotrophic microorganisms. The effluent is then chemically treated with low-cost chemicals to provide $Ca^{++}$ or $Mg^{++}$ ions necessary to form a phosphate precipitate such as calcium phosphate or magnesium-ammonium-phosphate (MAP). The autotrophic microorganisms can be cultivated in ponds, lagoons, or photobioreactors. The pH of the culture is adjustable within a preferred range of 7.5 to 10.5 by adjusting the photobioreactor operation. The process includes an economical flotation separator for solid, liquid, gas separation and a means of concentrating ammonia nitrogen that may also be removed during the process of phosphate reclamation.

7 Claims, 9 Drawing Sheets

Related U.S. Application Data

(60) Provisional application No. 61/997,096, filed on May 22, 2014.

(51) Int. Cl.
| | | |
|---|---|---|
| *C02F 1/24* | (2006.01) | |
| *C02F 9/00* | (2006.01) | |
| *C01B 21/087* | (2006.01) | |
| *C02F 3/12* | (2006.01) | |
| *C02F 3/30* | (2006.01) | |
| *C02F 3/34* | (2006.01) | |
| *C01C 1/28* | (2006.01) | |
| *C02F 101/10* | (2006.01) | |
| *C02F 101/16* | (2006.01) | |
| *C02F 1/66* | (2006.01) | |

(52) U.S. Cl.
CPC ............. *C02F 1/24* (2013.01); *C02F 3/1215* (2013.01); *C02F 3/308* (2013.01); *C02F 3/34* (2013.01); *C02F 1/5236* (2013.01); *C02F 1/66* (2013.01); *C02F 3/341* (2013.01); *C02F 2101/105* (2013.01); *C02F 2101/16* (2013.01); *C02F 2303/22* (2013.01); *Y02P 20/129* (2015.11); *Y02W 10/15* (2015.05); *Y02W 10/37* (2015.05)

(58) Field of Classification Search
CPC ...... C02F 3/34; C02F 3/341; C02F 2101/105; C02F 2101/16; C02F 2303/22; C02F 1/66; C01B 21/087; Y02W 10/37; Y02W 10/15; C01C 1/28; Y02P 20/129
USPC ....... 210/602, 603, 610, 611, 612, 619, 631, 210/903, 906; 95/245, 246, 254, 263
See application file for complete search history.

(56) References Cited

U.S. PATENT DOCUMENTS

| | | |
|---|---|---|
| 8,017,019 B2 | 9/2011 | Becker et al. |
| 8,263,034 B2 | 9/2012 | Chung |
| 8,404,121 B2 | 3/2013 | Bias et al. |
| 8,637,304 B1 | 1/2014 | Burke |
| 8,702,992 B2 | 4/2014 | Ren et al. |
| 8,802,323 B2 | 8/2014 | Hemmes et al. |
| 8,895,279 B2 | 11/2014 | Burke |

OTHER PUBLICATIONS

Xie, et al., Ammonia Removal by Sweep Gas Membrane Distillation, Water Research, 43:1693-1699 (2009).

\* cited by examiner

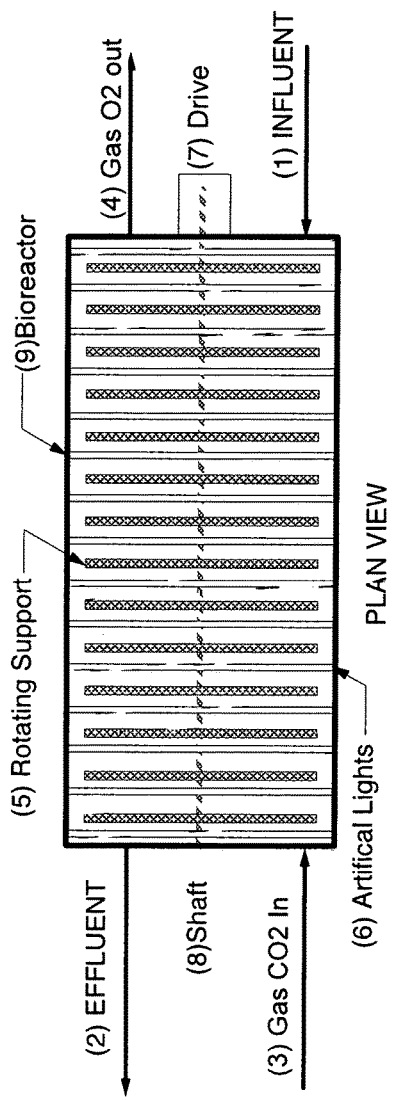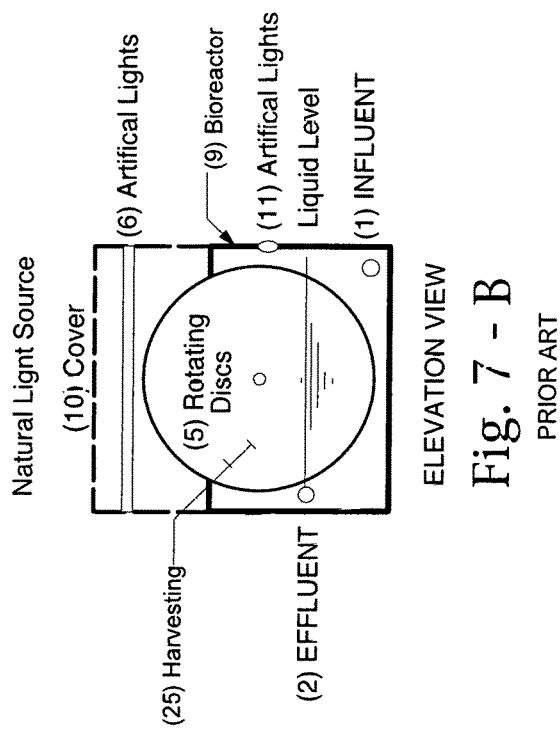
Fig. 7 - A
PRIOR ART
Fig. 7 - B
PRIOR ART

GAS SOLIDS SEPARATOR

REMOVAL AND RECOVERY OF PHOSPHATE FROM LIQUID STREAMS

CROSS REFERENCE TO RELATED APPLICATIONS

This is a divisional of U.S. patent application Ser. No. 14/545,572 filed on May 3, 2015, now U.S. Pat. No. 9,328,006. This application claims the benefit of U.S. provisional application 61/997,096, filed May 22, 2014, the entire contents of which are hereby incorporated by reference.

STATEMENT REGARDING FEDERALLY APPROVED RESEARCH OR DEVELOPMENT

None.

BACKGROUND OF INVENTION

Field of Invention

This invention is an economical method for recovering phosphate as a product from liquid streams through the use of autotrophic organisms that increase the pH and reduce the alkalinity of the liquid stream thereby reducing the need to purchase chemicals that increase the pH or reduce the alkalinity for the rapid production of phosphate precipitates.

Background

Phosphorus is an essential plant nutrient required for food production. The world has a limited supply of phosphorus to meet those needs. Unfortunately, most of the mined phosphorus is discharged or lost to the environment during food production and consumption. The discharge of phosphorus from agricultural drainage and waste treatment facilities also creates significant environmental problems such as stream, lake or estuary eutrophication resulting in reduced dissolved oxygen levels needed to support aquatic life. Phosphate also creates waste treatment difficulties by forming uncontrolled precipitates that clog pipes and hinder waste processing. As a result there is an intense interest in developing processes to recover phosphorus for reuse and to control unwanted precipitate formation. Phosphorus can be recovered from waterways, within waste treatment facilities, or the downstream anaerobic waste stabilization processes commonly used in municipal or agricultural waste processing. Anaerobic treatment processes are designed to reduce the volume of the solids while converting those solids to soluble inorganic and gaseous products. Anaerobic digestion causes the destruction of solids and the generation of methane, carbon dioxide, and hydrogen sulfide gases along with soluble inorganic products such as ammonia, phosphorus, magnesium, and calcium. The ammonia and phosphorus concentrations found in an anaerobic digester's effluent (digestate) are typically high. Ammonia concentrations of 500 to 3,500 mg/L and phosphorus concentrations of 50 to 500 mg/L are not uncommon. On the other hand, the phosphorus concentration in streams and waterways should be less than 0.1 mg/L.

To be recovered, orthophosphate (dissolved phosphorus) is converted to the particulate (solid) form and removed as a particulate by sedimentation, screening, filtration, or as a chemical precipitate that may or may not be crystallized. Phosphates that are associated with particulate matter can be screened through a series of fine screens. There are three basic phosphorus removal processes used in wastewater treatment: chemical, biological, and nano. Nano processes are processes that remove very fine particular matter through processes such as fine screening or membrane filtration. Biological phosphorus removal consists of accumulating dissolved phosphorus within phosphate accumulating organisms (PAO's) and exporting that particulate phosphorus in the biological waste stream (biosolids). Chemical processes convert phosphorus to a chemical species by adding a metal salt such as iron, aluminum, magnesium, calcium, lime or a combination of those chemicals. The efficiency of chemical phosphorus removal is dependent on two factors: the chemical equilibrium between the phosphorus liquid and solid phases and the efficiency of the solids removal process. Typically, the latter process controls the removal efficiency while the chemical use controls the cost.

Removal of phosphate by chemical addition is attractive for its simplicity of operation and ease of implementation. The commonly used chemicals are aluminum [Al(III)], ferric [Fe(III)], calcium [Ca(II)], Lime (CaO) or Magnesium (MgO, MgOH, $MgCl_2$). On the other hand those chemicals may increase the alkalinity thereby increasing the time required for precipitation of various phosphate compounds. Chemical treatment provides an opportunity for nutrient recovery of both phosphorus and nitrogen. In particular, controlled struvite precipitation processes, such as DHV's Crystalactor® (Netherlands), Paques' PHOSPAQ® (Netherlands), and Ostara Nutrient Recovery Technologies' PEARL™ process, are emerging processes that recover both nitrogen and phosphorus. Struvite or magnesium ammonium phosphate (MAP) precipitation is effective for phosphorus control, but cannot substantially reduce ammonia concentrations in the digestate. Available phosphate generally limits struvite ammonia recovery to less than 20%. However, struvite recovery is one of the few if not the only process that recovers some nitrogen and phosphorus. This invention does both. It can remove substantially all of the nitrogen and phosphate as any of a variety of nitrogen compounds and calcium phosphate, potassium ammonium phosphate (KAP), or magnesium ammonium phosphate (MAP), also known as struvite.

It is well known that aqueous phosphate can be very effectively precipitated with an excess of $Ca^{++}$ ions as calcium phosphate under conditions of high pH and low bicarbonate alkalinity. The addition of hydrated lime [$Ca(OH)_2$] is very effective in achieving both conditions since it provides the calcium required while increasing the pH. Lime, however, is a cumbersome chemical to use. Similarly, magnesium oxide (MgO) or magnesium hydroxide (MgOH), with or without NaOH, can provide the magnesium necessary while increasing the pH required for struvite or MAP recovery. Less costly chemicals, such as calcium chloride or magnesium chloride, can be used if the pH did not have to be raised to levels of 8 to 10 through the use of caustic chemicals such as NaOH, and MgOH. Less costly chemicals such as $CaCl_2$ (common road salt) or $MgCl_2$ could be used if the pH increase and alkalinity reduction were performed by an alternative process.

Formation of calcium phosphate requires low bicarbonate alkalinity. Ferguson[1] found that the rate of calcium phosphate production was primarily dependent on low alkalinity. For example, in one of his demonstrations he showed that the time required to remove 0.05 mM of phosphate at an alkalinity of 3.5 mM was 100 hours, whereas the time required to remove the same 0.05 mM of phosphate at an alkalinity of 0.5 mM was less than 10 hours. Alkalinity had a profound impact on the rate of removal, the required size of the reactors, and the efficiency of the process. Angel[2] had a similar experience. He successfully demonstrated at pilot scale the removal of 98% of sewage phosphate as $Ca_2$ (PO$_4$)$_2$. However, when he applied the technology at full scale it failed economically due to the "real world" higher alkalinities.

[1] Jenkins, Eastman, and Ferguson, Calcium Phosphate Precipitation at Slightly Alkaline pH Values, Journal WPCF Vol. 45, No. 4, April 1973 page 623.
[2] R. Angel, Removal of Phosphate from Sewage as Amorphous Calcium Phosphate, Environment Technology, Vol 30, pg 709-720, March 1999

Previous research has established that economical chemical removal and recovery of MAP or calcium phosphate requires high pH, low alkalinity, and highly soluble chemicals to provide magnesium or calcium ions. This invention provides those required conditions.

Burke[3] received a patent on a process to recover ammonia nitrogen from liquid waste streams without the use of chemicals. The process is an economical method for recovering nitrogen from liquid waste using autotrophic microorganisms in a photobioreactor without chemical additives. The organisms consumed $CO_2$ and bicarbonate thereby reducing alkalinity while increasing the pH. The liquid containing phosphate is introduced into a culture of autotrophic microorganisms in the presence of natural or artificial light, thereby producing a liquid effluent with an elevated pH and a substantially reduced bicarbonate alkalinity. While operating Burke's nitrogen removal process to recover ammonia from a highly concentrated digestate, it was observed that a precipitate began to accumulate in the photobioreactor. While demonstrating the process, it was also observed that the reactor was substantially devoid of calcium and that the alkalinity was very low due to the consumption of bicarbonate by the phototrophic organisms being grown in the photobioreactor. Further investigation established that the precipitate was amorphous calcium phosphate. A number of experiments were subsequently conducted to further remove phosphate by adding either calcium chloride or magnesium chloride to the effluent. Rapid (several minutes) precipitation and settling of calcium phosphate occurred upon the addition of small quantities of calcium chloride. Similarly a slower forming precipitate was produced upon the addition of magnesium chloride. It was clear that another method of economically removing and recovering phosphate from liquid streams had been discovered. The method does not require the addition of pH-increasing and bicarbonate-reducing chemicals. Simple inexpensive chemicals, such as ammonium chloride or magnesium chloride, could be used to supply the required $Ca^{++}$ or $Mg^{++}$ ions.

[3] Dennis A. Burke, U.S. Pat. No. 8,637,304, Jan. 28, 2014.

DESCRIPTION OF RELATED ART

Existing and emerging technologies for the removal and/or recovery of phosphate are thoroughly described in the existing technical literature, such as "Phosphate and Nitrogen Removal from Municipal Wastewater, Principles and Practice[4];" "Phosphorus in Action Biological Processes in Soil Phosphorus Cycling[5];" "Phosphorus Losses from Soil to Water[6];" "Nutrient Removal, WTF Manual of Practice Number 34[7];" "Phosphorus in Fresh Water and the Marine Environment: Progress in Water Technology[8];" "Phosphorus Removal from Wastewater[9];" and "Struvite Precipitation and Biological Dissolution[10]." Although many processes have been developed, there have been only a limited number of U.S. patents on removal of phosphorus from concentrated wastewater.

[4] Phosphate and Nitrogen Removal from Municipal Wastewater, Principles and Practice, Richard Sedlak, 1991, Lewis Publishers.
[5] Phosphorus in Action Biological Processes in Soil Phosphorus Cycling, Bunemann, Oberson, Frossard, 2011, Springer, Berlin.
[6] Phosphorus Losses from Soil to Water, H. Tunney, O T Carton, P. C. Brooks, A. E. Johnston, 1997, CAB International, NY, NY
[7] Nutrient Removal, WTF Manual of Practice Number 34, 2011 Water Environment Federation Alexandria, Va.
[8] Phosphorus in Fresh Water and the Marine Environment: Progress in Water Technology, S. H. Jenkins, January 1973, Pergamon Press.
[9] Phosphorus Removal from Wastewater Using Oven Dried Alum Sludge, Sarmad Rashid, Wadood Mohammed Jan. 8, 2013.
[10] Struvite Precipitation and Biological Dissolution, Ander Ezquerro, June 2010, KTH-Water, Sewage and Waste Technology, Department of Land and Water Resource Engineering, Royl Institute of Technology (KTH), SE-10044 Stockholm, Sweden.

In June 1960, Caldwell received U.S. Pat. No. 2,942,967 for the "Production of a Calcium Phosphate Fertilizer with Reduced Hygroscopicity." The process utilized a number of chemicals, including $HNO_3$, HCl, KCl, $NH_3$, and $NH_4NO_3$ to produce a potassium ammonium phosphate fertilizer, a process that would be uneconomical today.

In 1976, Kleber received U.S. Pat. No. 3,956,118 for a method to chemically remove phosphates from waste waters by treating the phosphate-containing waste water with a trivalent rare earth salt, generally as a mixture of such salts, to form an insoluble rare earth phosphate precipitate, and then separating the precipitate from the waste water.

In September 2000, Bender received U.S. Pat. No. 6,123,981 for a method for recovering orthophosphate from animal feed processing. Alkaline trisodium orthophosphate was reacted and sterilized with calcium chloride to form calcium phosphate. The resulting precipitate was removed from the aqueous stream by filtration or centrifugation or other means for separation.

In May 2005, Vinotti, et al., received U.S. Pat. No. 6,893,567 for a wastewater treatment system that consisted of nitrification of wastewater and increasing the pH of the nitrified wastewater by adding a metal-containing salt and sodium hydroxide to precipitate phosphorus as a useable product having a specified nitrogen to phosphorus ratio. The precipitated phosphorus is recovered and used to form useable phosphorus products. The process relies on reduced levels of carbonate, ammonium buffers, and suspended solids by adding an alkaline earth base to said wastewater to precipitate soluble phosphate. The alkaline earth base was selected from the group consisting of calcium hydroxide, magnesium hydroxide, calcium oxide, magnesium oxide, and mixtures thereof. Basically, the process reduces the buffering capacity of the waste by removing the ammonia through a nitrification process followed by chemically increasing the pH and alkalinity through the addition of caustic chemicals. Burke's proposed process (this application) removes ammonia nitrogen through any of a variety of known or to be known processes followed by the use of phototrophic organisms to increase the pH and reduce the alkalinity. A portion of the ammonia separated by the process can be used to meet the requirements for struvite precipitation. Less costly metal ions, such as calcium chloride or magnesium chloride, are added to precipitate MAP or a variety of calcium phosphate compounds.

In April 2012, Zhang, et al., received U.S. Pat. No. 8,158,089, entitled "Compositions and Methods for Wastewater Treatment." The patent application was motivated by the fact that MAP or struvite could not be precipitated from digestate containing both calcium and magnesium such as anaerobically digested dairy manure. The phosphorous was bound up as calcium phosphate, preventing precipitation of magnesium phosphate. The process consisted of utilizing a wastewater having calcium-sequestered phosphate (unavailable phosphate); adding to the wastewater a calcium chelating or sequestration agent suitable to chelate or sequester $Ca^{++}$ ions from the calcium-sequestered phosphate to facilitate release of phosphate from the calcium-sequestered phosphate; transferring, facilitated by said $Ca^{++}$ ion capture and in the presence of sufficient concentrations of $NH_4^+$ and $Mg^{++}$ ions; converting the phosphate into struvite (magnesium ammonium phosphate hexahydrate or $MgNH_4PO_6H_2O$), or hydrated magnesium ammonium complex of phosphate; and recovering the struvite, or the formed hydrated magnesium ammonium complex. Preferably, the method further comprised acidification of the effluent or wastewater to facilitate release of $Ca^{++}$ ions from the calcium-sequestered phosphate and chelation or sequestration of the $Ca^{++}$ ions by the calcium chelating or sequestration agent. The method can further provide a phosphate-containing fertilizer comprising struvite, and methods for making same.

In October 2014, Barak received U.S. Pat. No. 8,864,992, entitled "Phosphate Recovery from Acid Phase Anaerobic Digesters." The patent described a method for recovering phosphate from sewage treatment plants using multi-stage anaerobic digestion process that includes the treatment of organic acid digestate with calcium hydroxide, calcium oxide, and similar compounds to raise pH to near neutral values and precipitate calcium phosphate compounds such as brushite and similar amorphous compounds. The method included the formation of calcium phosphates on weak-acid ion exchange columns and membranes in contact with organic acid digestate. The system included removal of the calcium phosphate compounds formed by sedimentation, either static or against an upwelling flow, centrifugation, or filtration.

There have been numerous articles, publications and books on struvite formation and the factors controlling precipitation. Besides the pH, those factors include temperature, ionic strength of the solution, and magnesium ammonium and phosphates' molar ratios. The optimum pH value is close to 9.2 for MAP precipitation. The optimum loading to the reactor is supposed to be close to $Mg:NH_4:PO_4=1.7:1:1.1$ M. The optimum loading is rarely used due to the relatively high costs of the raw chemicals that are needed compared to the conventional methods for phosphate removal. Usually, NaOH is used to control the pH and some magnesium salt is added to supply the needed $Mg^{++}$ ions. Normally, there is an overabundance of ammonium. Raw chemicals costs are primarily for MgO or another source of magnesium and NaOH. The high cost of chemicals to increase the pH and reduce alkalinity discourages adoption of the process since it is not economical due to the high cost of magnesium compounds.

In May 2010, Amba, et al., received U.S. Pat. No. 7,722,768 for a process that simultaneously removed BOD and phosphate from waste water. The process consisted of feeding a liquid containing BOD-oxidizing biomass to a reactor; ensuring that the liquid in the reactor contains an excess of the stoichiometry of ammonium and magnesium relative to phosphate and struvite; oxidizing at least part of the BOD; adjusting the pH of the liquid in the reactor at a desired value; forming solid struvite in the reactor; separating at least part of the solid material from the reactor effluent; and returning a part of the solid material to the reactor. The pH of the reactor was increased to 7.5 to 11. The process maintained a biomass retention time in the reactor such that nitrification of ammonium in the reactor was below 25%. The pH was adjusted by removing $CO_2$ and adding chemicals to achieve pH values of 8 to 9. Phosphate was removed by struvite crystallization in a second reactor by feeding $MgCl_2$ and NaOH solutions.

In November 2010, Chung, et al., received U.S. Pat. No. 7,842,186 for a method of removing phosphorus and/or nitrogen that consisted of stripping $CO_2$ from an anaerobic digester effluent without the addition of an alkaline substance, and "then providing proper pH of 8.4 to 9.6" to form struvite. They also claimed a method of injecting an alkaline substance into early-, mid- or late-stage of step (b), $CO_2$ stripping. Chung also claimed that many researchers have reported that the appropriate pH for MAP formation is from 8 to 10. The optimum pH is reported as 9.0 to 9.2. However, most of the developed MAP producing technologies use alkaline substances to increase the pH, but fail to achieve a pH higher than 9 due to high expense of NaOH addition. Further, it is unclear if Chung adds chemicals following $CO_2$ stripping. It has been known for many years that one can achieve pH values of 8.3 to 8.4 through ammonia stripping. But, something else must be done to raise the pH beyond 8.4. Chung states that increases in pH occur without addition of alkaline substance, through $CO_2$ stripping alone. The justification was that "When the carbon dioxide is stripped from the treated water of step (a), the pH naturally increases up to 8.4 to 9.6 without addition of alkaline substance."

In September 2011, Becker, et al., received U.S. Pat. No. 8,017,019 for a fluidized bed precipitator with optimized solids settling and solids handling features for use in recovering phosphorus from wastewater. Becker stated the following: "Fluidized bed systems for precipitating phosphorus from waste waters are typically operated under the assumption that a pH adjusting additive and a magnesium ion contributor are needed to achieve high (>70%) phosphorus recovery levels. However, it has been found that high phosphorus recoveries can be obtained in such fluidized bed systems by addition of an additive consisting essentially of an ammoniacal material, and especially a material selected from the group consisting of liquid ammonia, gaseous ammonia, and mixtures thereof. Use of such ammoniacal materials, in lieu of pH adjustors such as NaOH, favors struvite production over alternative precipitates, making for higher solids retainment and easier solids handling." In other words, chemicals to increase the pH were unnecessary. It is also known that as MAP forms at a pH close to 9.2, $Mg^{++}+NH_4^++H_2PO_4^-+6\ H_2O \rightarrow MgNH_4PO_4.6H_2O+2H^+$ alkalinity is reduced.

In September 2012, Chung received U.S. Pat. No. 8,263,034 for a nitrogen-rich waste water treatment method for producing struvite. This invention provided supplemental phosphorus to treat waste with a high nitrogen content. The method includes the steps of: (a) an anaerobic treatment step treating the wastewater and a first solution containing phosphorus ion with anaerobic microorganisms in an anaerobic reactor; and (b) struvite formation in a struvite reactor for producing struvite. In addition, step (b) further comprises a step of adjusting the pH to 8 or higher by adding a base. The base used may be NaOH, KOH and the like as a general alkali agent and the base is not particularly limited in the invention.

In April 2014, Ren, et al., received U.S. Pat. No. 8,702,992 for a continuous flow reactor and method of using the same for treating nitrogen and phosphorus containing wastewater. The reactor was a continuous flow reactor, including a cylindrical coagulation crystallizer. Ren claimed that studies show that the optimal pH value in the recovery of nitrogen and phosphorus by the MAP crystallization and precipitation method ranges from 9.0 to 10.7, and when the molar ratio of all components for precipitating MAP is controlled according to the following relationship: $n(Mg^{++}):n(NH_4^+):n(PO_4^{3-})=1.2-1.4:1:0.8-1$, the ratio for forming struvite is optimal. Therefore, the dosage and variety of Mg salt are the key factors for formation of magnesium ammonium phosphate. The reactor includes a pH regulator that controls pH through the addition of HCl solution (acid liquor) or NaOH solution (alkaline liquor). The magnesium source is $MgSO_4$, MgCl, MgO, or a mixture thereof. The pH regulator solution is added in the reaction process to retain the stable pH value in the reaction liquid, so that the optimal crystallization process of MAP is realized.

Hemmes et al. received U.S. Pat. No. 8,802,323 in August 2014 for the production of ammonium salts and decomposing those salts to produce ammonia gas as the fuel for a fuel cell. One of the salts chosen was struvite that was formed by adding phosphate and one or more alkaline earth cations to the ammonium solution. Crystallization was induced by controlling the pH and temperature. The pH was controlled by adding chemicals. The crystals formed were magnesium ammonium phosphate (MAP) or potassium ammonium phosphate (KAP). Other salt metals could be chosen from Li, K, Mg, Ca, V, Cr, Mn, Fe, Co, Ni, Cu or Zn, and the anions were selected from fluoride, chloride, bromide, iodide, nitrate, thiocyanate, sulphate, molybdate, phosphate, and chlorate ions. The crystallization unit may be a fluid bed crystallizer or a slurry crystallizer.

The existing art of removing orthophosphate from a liquid stream consists of adding chemicals that increase the pH to an optimum of 9.2 and thereby form calcium phosphate or MAP. The different ways of increasing pH identified in the prior art are the addition of MgO, MgOH, CaO or CaOH, NaOH, or $CO_2$ stripping. The use of lower cost chemicals, such as $MgCl_2$ or $CaCl_2$, to provide calcium or magnesium ions requires the use of a base such as sodium hydroxide.

Some embodiments of the present invention use methods and apparatus previously disclosed in U.S. patents to Burke and in U.S. Pat. No. 8,404,121 to Bias, et al. In May 2005, Burke received U.S. Pat. No. 6,893,572 for a solids accumulating flotation—separator. The separator provided a method for accomplishing the separation of solids from liquids utilizing a variety of gases in a closed reactor. The method comprises feeding an influent stream containing liquids and solids into a vessel while removing clarified liquid during the feeding process. The method further includes emptying the solids from the vessel based on the solids having formed a float blanket of a predetermined depth. The solids are removed from the vessel through a bottom nozzle as opposed to being skimmed off the top surface with mechanical separators. The process provided an ideal means for managing both gases and suspended solids in a closed vessel.

In 2013 Bias, et al., received U.S. Pat. No. 8,404,121 for a method for separating suspended solids from a waste fluid utilizing the same vessel as Burke's U.S. Pat. No. 6,893,572, except that the solids were removed from the top using a circular weir, a practice that other investigators have been unable to duplicate without diluting the float solids concentration. The Bias, et al., disclosure relates to a separation process in which an aerated inlet mixture of fluid and solids is fed into a flotation separation vessel and is separated into an upper float layer and a lower clarified layer. The upper float layer is withdrawn from the vessel when the height of the upper float layer exceeds the height of an overflow conduit and forms a concentrated solids effluent. The lower clarified layer is withdrawn from the separation vessel as a clarified fluid effluent. The separation process is performed continuously using a control process that maintains a relatively stable distribution between the lower clarified layer and the upper float layer. The resulting process was claimed to have improved stability (e.g., being continuously operable without interruption and/or operable for extended periods between intermittent cleaning processes) and provides a concentrated solids effluent with solids concentrations higher than those previously attainable in similar separation processes.

In October 2010, Burke received U.S. Pat. No. 7,811,455 for a method for removal of ammonia nitrogen from anaerobic fermentation effluent and sequestration as ammonium bicarbonate and/or carbonate while producing a higher BTU biogas. The method included the steps of removing the slurry from the digester, stripping the ammonia from the slurry or portion thereof with a high BTU biogas, blending the stripped ammonia with the digester's biogas to remove the carbon dioxide and precipitate ammonium bicarbonate/carbonate as a solid while producing a high BTU biogas, a portion of which is used to strip the ammonia and $CO_2$ from the slurry. The process removed ammonia nitrogen from the digester effluent while producing a high BTU biogas and a solid ammonium bicarbonate/carbonate product. Ammonia stripping was accomplished with a recycled stripping gas deficient in $CO_2$ and ammonia that is capable of removing the $CO_2$ and ammonia from solution by virtue of the lower partial pressures of $CO_2$ and ammonia.

Ammonia stripping was accomplished by raising the pH and/or temperature to shift the ammonium to ammonia gas and strip the gas. The pH was increased by adding caustic chemicals or by $CO_2$ gas stripping. The caustic chemical reagents included one or more of the hydroxides of sodium, magnesium, potassium or calcium, or magnesium oxide. The process also included increasing the pH of the liquid stream effluent from the digester through the use of live microorganisms that consume carbon dioxide and/or consume bicarbonate/carbonate. The process further included passing the biogas through a biological treatment process to remove hydrogen sulfide and oxygen therefrom prior to its entry into an ammonium bicarbonate precipitation chamber.

In January 2014, Burke received U.S. Pat. No. 8,637,304 for ammonia nitrogen recovery through a biological process. The process provided an economical method for recovering nitrogen from liquid waste using autotrophic organisms and minimal energy inputs and without chemical additives. Solids were separated from anaerobically digested liquid waste using a solids, liquid, gas separator similar to that disclosed in Burke's U.S. Pat. No. 6,893,572. Bias, et al., duplicated that separator and their method used the same vessel. FIG. 3 of Burke's U.S. Pat. No. 6,893,572 is presented herein in FIG. 6 as prior art. The process included removal of suspended solids from the digested liquid and stripping carbon dioxide from the digested liquid by a vacuum flotation degassing unit. The stripping gas included air. Claim 6 of Burke's U.S. Pat. No. 6,893,572 stated in relevant part: "The method . . . further comprising passing digested liquid of step (a) through a liquid/solids separator prior to step (b) and passing a purge gas through the liquid solids separator, thereby producing a carbon dioxide enriched gaseous effluent from said liquid/solids separator. "As shown in FIG. 6, digestate or a liquid containing suspended solids, ammonia and $CO_2$ entered the separator. Gas, delivered with or without a blower or compressor, was also introduced into the separator and sparged below the digestate influent. At the same time, a vacuum pump removed a $CO_2$-enriched gas and a gas deficient in ammonia. The effluent liquid having a higher pH and low solids content was subsequently discharged.

Burke's U.S. Pat. No. 8,637,304 for ammonia nitrogen recovery through a biological process separated solids and $CO_2$ from anaerobically digested liquid waste. After pretreatment the resulting translucent liquid was introduced to a culture of autotrophic microorganisms in the presence of natural or artificial light, thereby accumulating biomass and producing a liquid effluent with elevated pH. The elevated-pH, liquid effluent was heated and stripped of ammonia, thereby producing a water vapor and stripped ammonia gas stream. The water vapor ammonia gas stream was condensed to form a liquid/ammonia condensate. The autotrophic microorganisms were advantageously cultivated in a photobioreactor comprising a plurality of axially spaced-apart, growth plates mounted for rotation to a shaft. The pH of the culture was adjustable within a preferred range of 8.0 to 10.5 by adjusting the light intensity and rotational speed. Ammonia and water vapor were stripped from the plates and condensed to form a liquid ammonia condensate. The method included restripping the liquid ammonia condensate or use of a gas-permeable membrane to form a more concentrated liquid ammonia condensate by removing water.

In February 2014, Burke received U.S. Pat. No. 8,895,279 for applications of the rotating photobioreactor, which disclosed a method whereby microorganisms consume bicarbonate in a nutrient-laden, liquid influent, causing the pH of the liquid introduced to increase and convert ammonium to ammonia gas. The ammonia gas, together with water vapor, was stripped by passage of stripping gas past the growth plates. The process included condensing the stripped gas using a chiller to form a condensate product.

In 2015, Burke filed U.S. patent application 2015/0079651 for a method to recover and harvest nutrients and volatile gases such as alcohols from a liquid stream using a fixed film photobioreactor. The method was a process for recovering volatile and non-volatile products from a substrate-laden influent stream using microorganisms growing in a rotating bioreactor contactor. The bioreactor included a vessel, a shaft mounted for rotation within said vessel about a shaft axis, a plurality of axially spaced-apart, growth plates attached to the shaft, each of the plates having surfaces to which a fixed film of the microorganisms are attached, and means for rotating the shaft and plates about the axis. The method comprised the simultaneous steps of: (a) operating the rotating bioreactor as an aerobic, facultative, or anaerobic reactor; (b) feeding the influent stream past the growth plates such that the growth plates were partially submerged within the stream, whereby, as they grew, the microorganisms converted the substrate to volatile products and accumulated biomass; and (c) passing a stripping gas past the growth plates to harvest the volatile products as stripped gas. The microorganisms included heterotrophic microorganisms capable of converting the substrate into alcohols, whereby the stripped gas included butanol or other linear or branched chain alcohols. The process also included producing an effluent stream of highly concentrated aqua ammonia concentrated to 12 percent (w/w) or more, suitable for use in the pretreatment of lignocellulosic biomass for renewable energy production, or an effluent stream comprises a highly concentrated aqua ammonia concentrated to 20 percent (w/w) or more, suitable for use as diesel exhaust fluid.

SUMMARY OF THE INVENTION

This invention is a process for reducing the chemical cost associated with phosphorus removal and or recovery from liquid streams. This invention can be visualized as a simple, four-step process. The first step of the process is optional, depending on the waste or liquid stream being processed. The optional first step process may include: 1) removal of fine particulate solids, some of which may include adsorbed phosphate or various particulate phosphate complexes; 2) removal of $CO_2$ gas to improve the efficiency of bicarbonate removal while achieving pH values approaching 8.4; 3) removal of ammonia to reduce or eliminate the toxicity to the phototrophic organisms while minimizing ammonia buffering. The first step may also include increasing or decreasing the temperature to achieve optimum operating conditions. A gas/solids separation unit for the removal of fine particulate matter and particulate phosphate while stripping $CO_2$ and other undesirable gases from the influent may be used (Burke, U.S. Pat. No. 8,637,304, FIG. 3) is reproduced here in FIG. 6. That separation unit increases the pH from 7.5± to about 8.3± through the removal of $CO_2$ gas in addition to suspended solids removal. The present invention provides a new and improved vacuum flotation separator that continuously removes suspended solids and $CO_2$ from the separator while discharging a reduced-turbidity, high-pH (8.3±) effluent for further processing.

The second step of the process uses phototrophic organisms to decrease bicarbonate alkalinity, through consumption of bicarbonate required by the organisms for growth, while increasing the pH from about 8.3± to 10.5±. Natural and/or artificial light and any of a variety of autotrophic organisms are used to promote growth of the phototrophic organisms, which consume the bicarbonate in solution to produce oxygen and raise the pH. The use of autotrophic organisms eliminates the need for costly chemicals. The autotrophic organisms may be harvested from time to time to recover biomass for energy or other productive purpose.

The third step of the process is the addition of low-cost chemicals to supply the required $Ca^{++}$ and/or $Mg^{++}$ ions to create a calcium phosphate or magnesium phosphate compound. The chemicals may be added to the phototrophic organism reactor or some other short detention time reactor.

The fourth step of the process is the precipitation and separation of crystalized or aggregated compounds utilizing any of a number of separation techniques including crystallization, cyclones, lemma separators, fluidized bed reactors, solid contact reactors, membranes, etc. Ferguson analyzed a number of reactors for calcium phosphate precipitation and crystallization. They included continuously stirred tank reactors (CSTR), CSTR with recycle, tube reactor, tube reactor with solids recycle similar to a fluidized bed. Any of the commonly used reactors for precipitating, flocculating, or crystallization may be used. Various embodiments of this process may require the removal and reclamation of ammonia nitrogen that has value directly proportional to its concentration. Consequently, the present invention includes a process for concentrating condensed ammonia nitrogen to produce highly concentrated ammonium hydroxide products. For the optional preconditioning step, the invention further includes an improved gas/solids separator using vacuum suction to remove flotation solids floated to a liquid surface by a sparging gas.

BRIEF DESCRIPTION OF THE DRAWINGS

FIG. 7 A presents a plan view of a rotating photobioreactor.

FIG. 7 B presents an elevational view of the rotating photobioreactor of FIG. 7A.

DETAILED DESCRIPTION OF THE INVENTION

The essence of this invention is to reduce the use of costly chemicals commonly used to raise the pH of a liquid stream for the removal of phosphate and the creation of phosphate products that are removed through any of a variety of separation techniques commonly used in chemical engineering applications. Typically, the chemicals used to precipitate soluble orthophosphate include NaOH, MgO, MgOH and CaOH. Those chemicals raise the pH and supply the calcium or magnesium ions necessary to form magnesium-ammonium-phosphate (MAP), apatite, monocalcium ($Ca(H_2PO_4)_2$) dicalcium ($CaHPO_4$), or tricalcium ($Ca_3(PO_4)_2$.) phosphate. Air stripping is also used to remove carbon dioxide and thereby increase the pH of the solution to 8.4±. This invention uses autotrophic or phototrophic microorganisms that consume bicarbonate and thereby increase the pH of the liquid stream while decreasing the bicarbonate alkalinity, the two requirements for rapid and complete removal of phosphate from solution. The economic value of the process is predicated on developing a substantial and rapidly growing biomass to consume the carbon dioxide and bicarbonate as quickly as possible. The growth of autotrophic microorganisms requires suitable environmental conditions, such as pH, temperature, and absence of toxic constituents.

Figure 1:
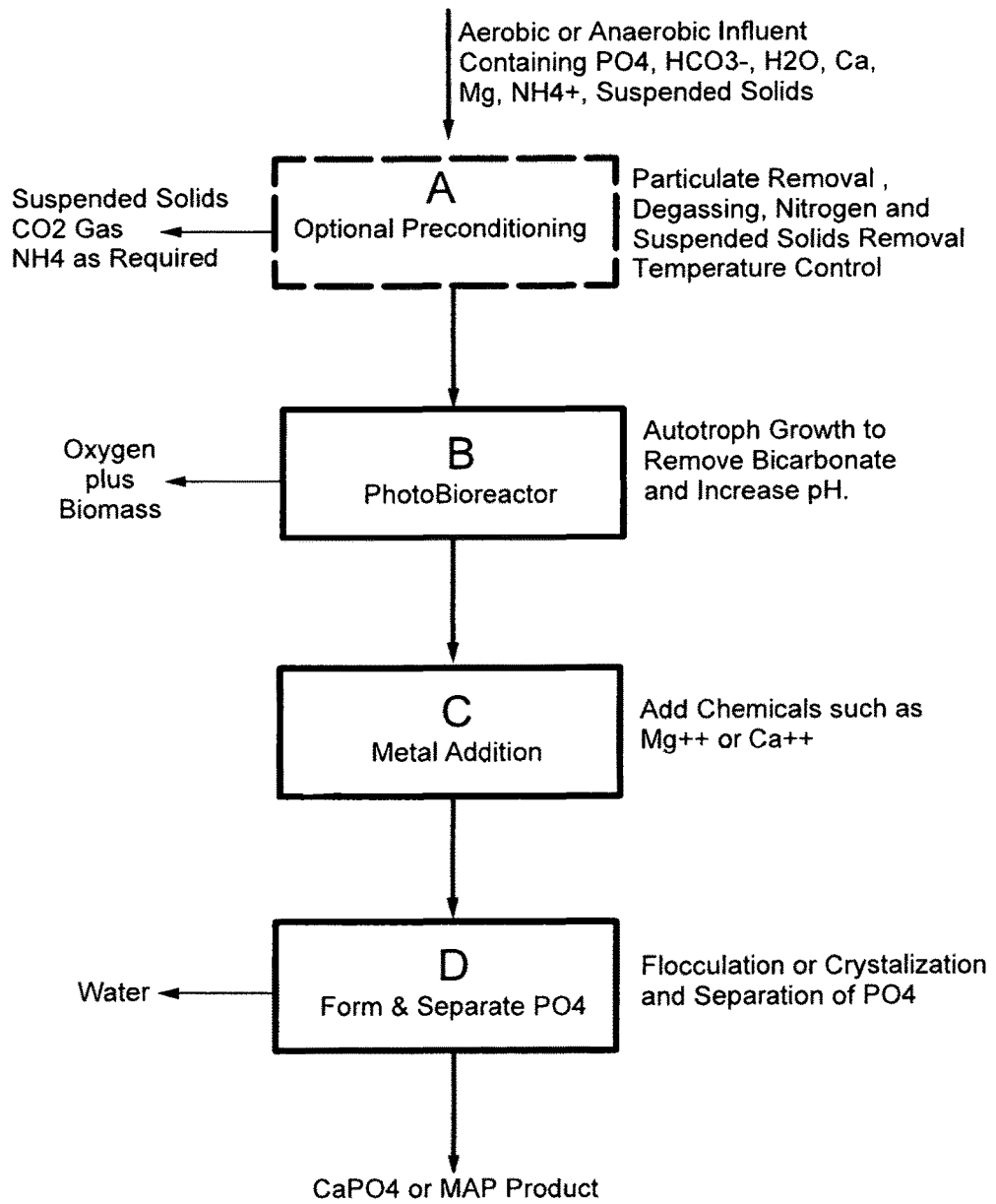
FIG. 1 presents a schematic of the process steps for removal and or reclamation of phosphate from liquid streams. It is a four-step process with the first step being an optional step as represented by dashed lines.
Figure 6:
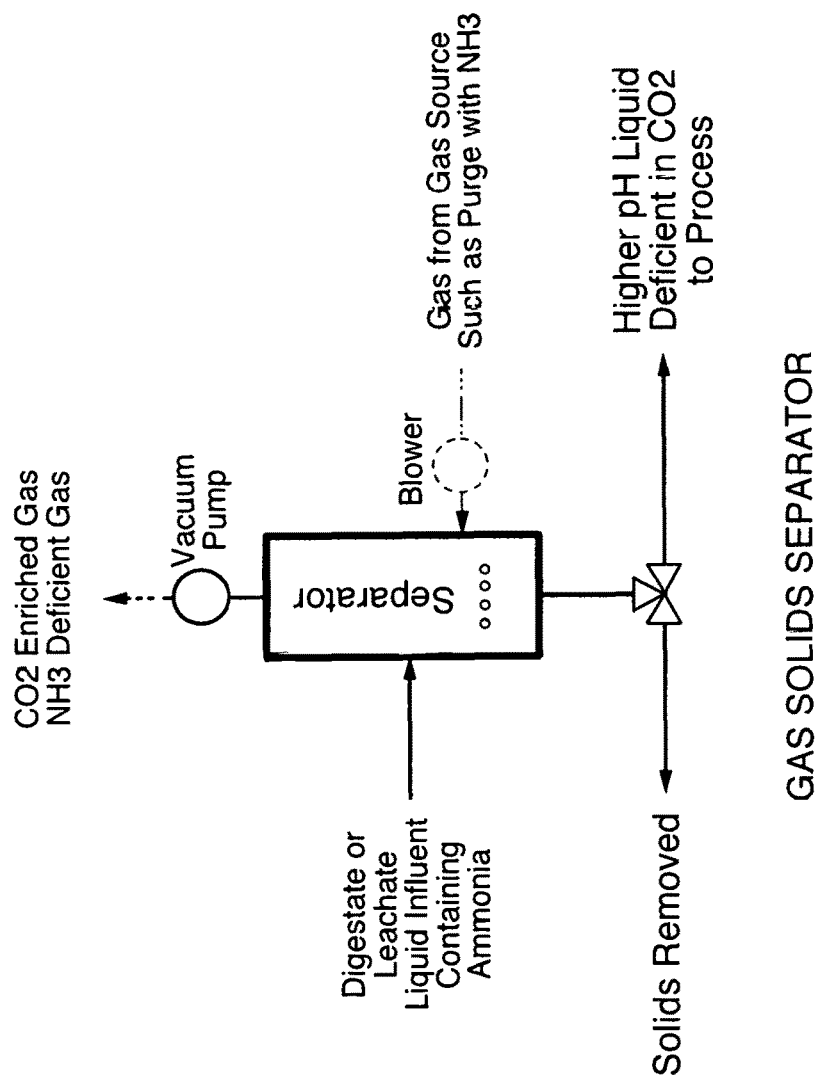
FIG. 6 presents the prior art pretreatment gas solid separation unit for removing both suspended solids and $CO_2$ gas.
Figure 9:
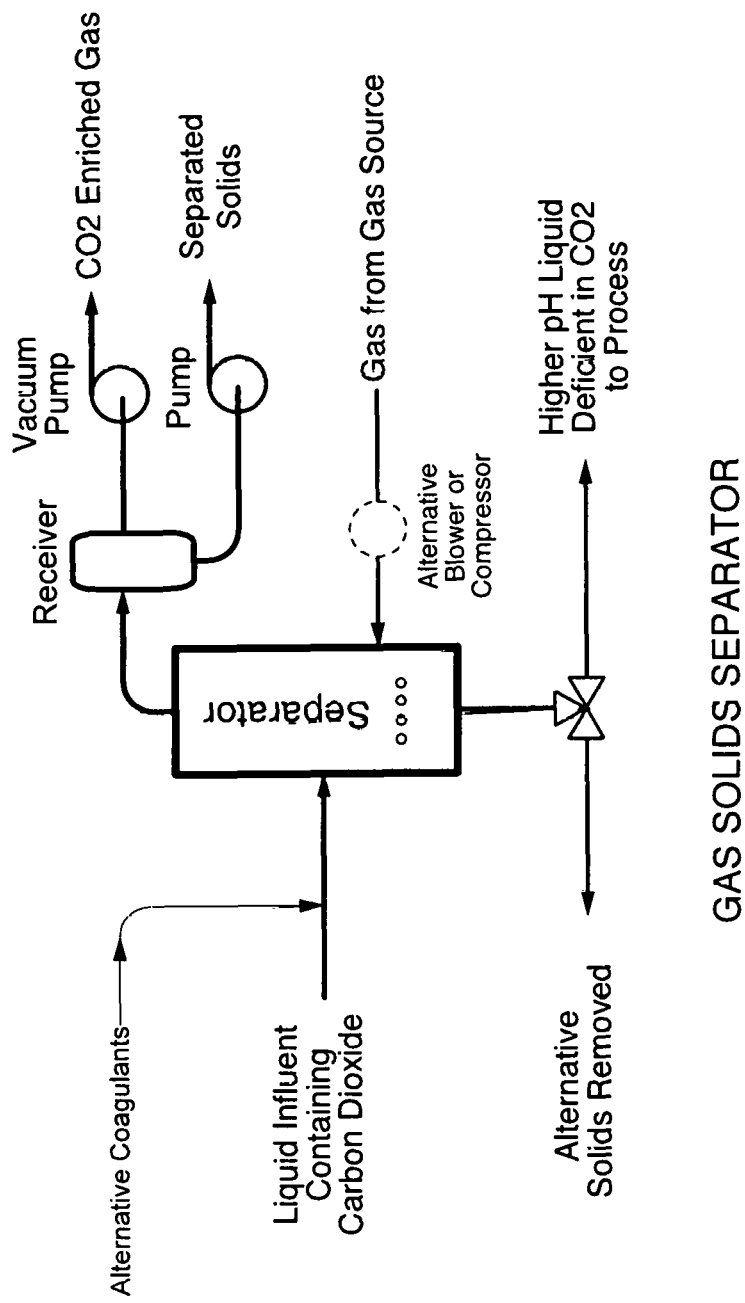
FIG. 9 presents an improved gas solids separator for continuously removing suspended solids.

As shown in FIG. 1, the first step (A) of the process preferably is to remove constituents that may adversely impact the process by uneconomically inhibiting the growth of autotrophic or phototrophic organisms. Environmental conditions of concern here include: a) turbidity or the ability to transfer light to the autotrophic microorganisms; b) ammonia nitrogen that both buffers the solution and is toxic, as $NH_3$, to phototrophic organisms; and c) temperature that may not be suitable for the microorganisms being grown. Consequently, the optional unit processes that can be carried out in the first step are dewatering to remove suspended solids, extraction of carbon dioxide and other toxic gases that may be present, and/or increasing or decreasing the temperature to meet the needs of the phototrophic organisms. FIG. 6 presents a prior art device that accomplishes several of those goals. FIG. 9 presents an improved device for solids flotation and gas stripping. The optional step A may also include dilution to reduce the concentration of ammonia or alkalinity. Ammonia nitrogen removal can be accomplished through a wide variety of processes that include nitrification/denitrification, nitrification, nitration, Anammox®,[11] ion exchange, ammonia stripping, etc.

[11] Anammox® is a registered mark of World Water Works, Inc. of Oklahoma City, Okla., and denotes an ammonium removal technology wherein nitrite and ammonium are converted directly into dinitrogen gas by bacteria in the phylum Planctomycetes.

Figure 2:
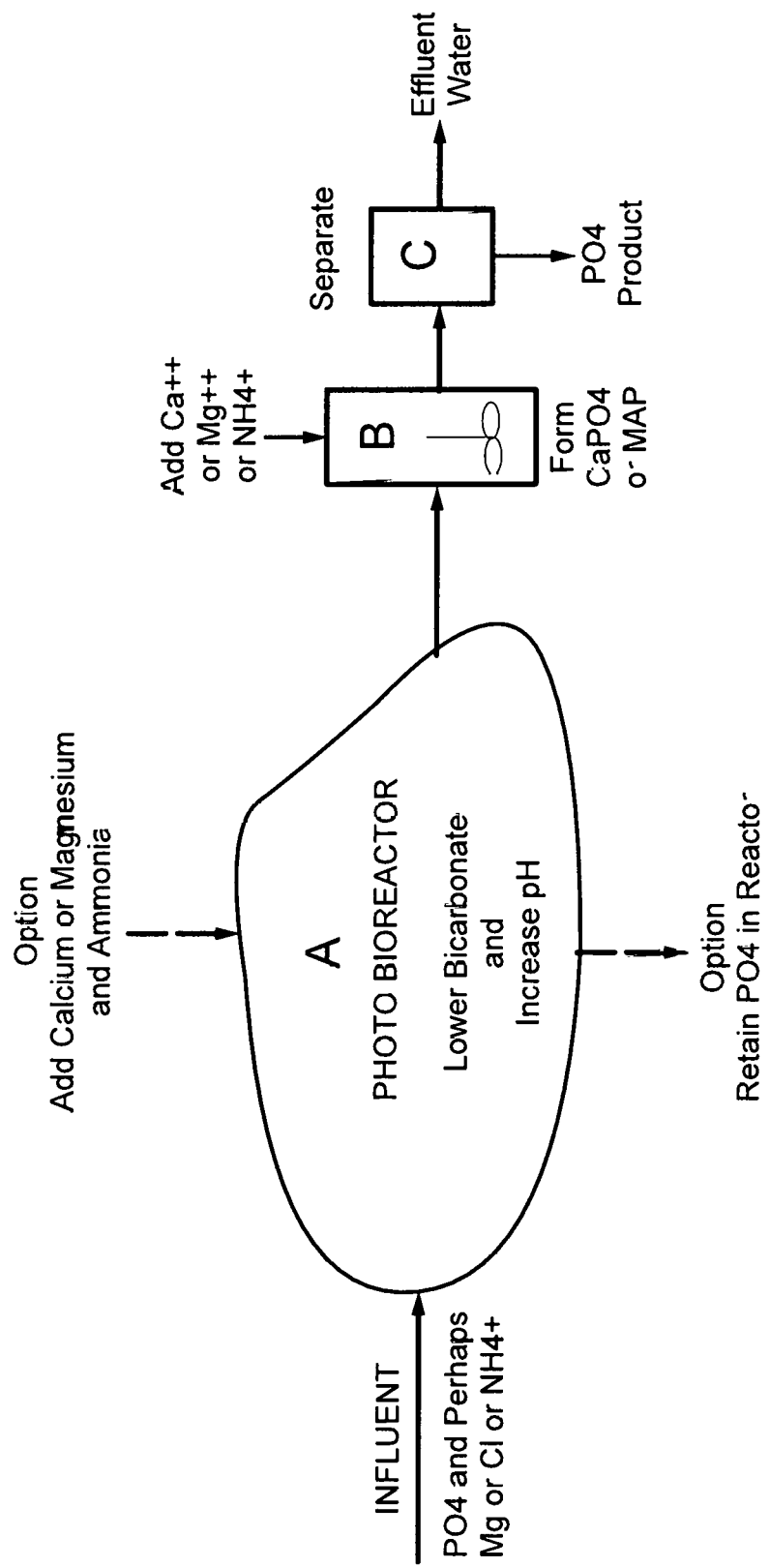
FIG. 2 presents a block diagram of the process with the optional step of precipitation with or without the use of chemicals within the phototrophic growth reactor.

After completion of step A of FIG. 1 (optional preconditioning), the liquid containing phosphate ($PO_4^{3-}$), and bicarbonate $HCO^{3-}$, reduced quantities of ammonia $NH^{4+}$, $Mg^{++}$, or $Ca^{++}$, is introduced to a reactor—for example, the rotating phototrophic bioreactor depicted in FIGS. 7A and B. The reactor (A) in FIG. 2 can be a lake, pond, lagoon, photobioreactor, a fixed film photobioractor, or advantageously a rotating photobioreactor as depicted in FIGS. 7A, 7B and as described in U.S. Pat. No. 8,637,304 and U.S. Pat. No. 8,895,279. Light can be provided from a variety of sources, including natural light. The photobioreactor normally incorporates a light/dark cycle wherein bicarbonate is consumed by the photo autotrophs during the day with nitrification occurring during dark periods, further reducing alkalinity. Referring to FIGS. 7A, 7B, a rotating photobioreactor (9) is seen to comprise a vessel, a shaft (8) mounted for rotation within the vessel about a shaft axis, a plurality of axially spaced-apart, growth plates (5) attached to the shaft, each of the plates having surfaces to which a fixed film of the microorganisms is attached, means (e.g., an electric motor drive (7)) for rotating the shaft and plates about the axis, illumination means (e.g., artificial lights (6) or sunlight through the cover (10)) for shining light upon the microorganisms, and means (25) for harvesting the microorganisms from the growth plates, such as doctor blades and/or a vacuum suction device. In addition to light, inputs to the rotating photobioreactor are a nutrient-laden, influent (1), in which the rotating disks (5) are partially submerged, and carbon dioxide gas (3) that serves as a carbon source for the microorganisms. Outputs from the rotating photobioreactor are an effluent (2) with elevated pH caused by the microorganisms' consumption of bicarbonate/carbonate in the influent, oxygen gas (4) produced by the microorganisms, and the microorganisms' biomass, which is removed from the photobioreactor (9) by the harvesting means (25). For a more detailed description of a rotating photobioreactor, see U.S. Pat. No. 8,895,279, the entire contents of which are hereby incorporated by reference. If sufficient calcium or magnesium is present in the influent to form a phosphate precipitate no additional metal ions need to be added. Supplemental calcium ions or magnesium ions may be added directly to the reactor (A) in FIG. 2 if insufficient metal ions are not available to sufficiently precipitate calcium phosphate or MAP. The phototrophic organisms will consume the bicarbonate and increase the pH during the day. Calcium and/or magnesium and ammonia may be added as necessary to the photobioreactor's effluent in a downstream reactor (B) to form calcium phosphate, KAP, or MAP. The calcium phosphate may be flocculated within a reactor (B) by slow stirring in a solids contact reactor or other means or crystallized to form MAP within a tubular or fluidized bed reactor (B). A variety of suitable reactors have been previously described by Ferguson[12]. The aggregated or crystallized phosphate precipitate is then reclaimed in a second downstream separator (C).

[12] Jenkins, Eastman, and Ferguson, Calcium Phosphate Precipitation at Slightly Alkaline pH Values, *Journal WPCF* Vol. 45, No. 4, April 1973, page 627.

Figure 3:
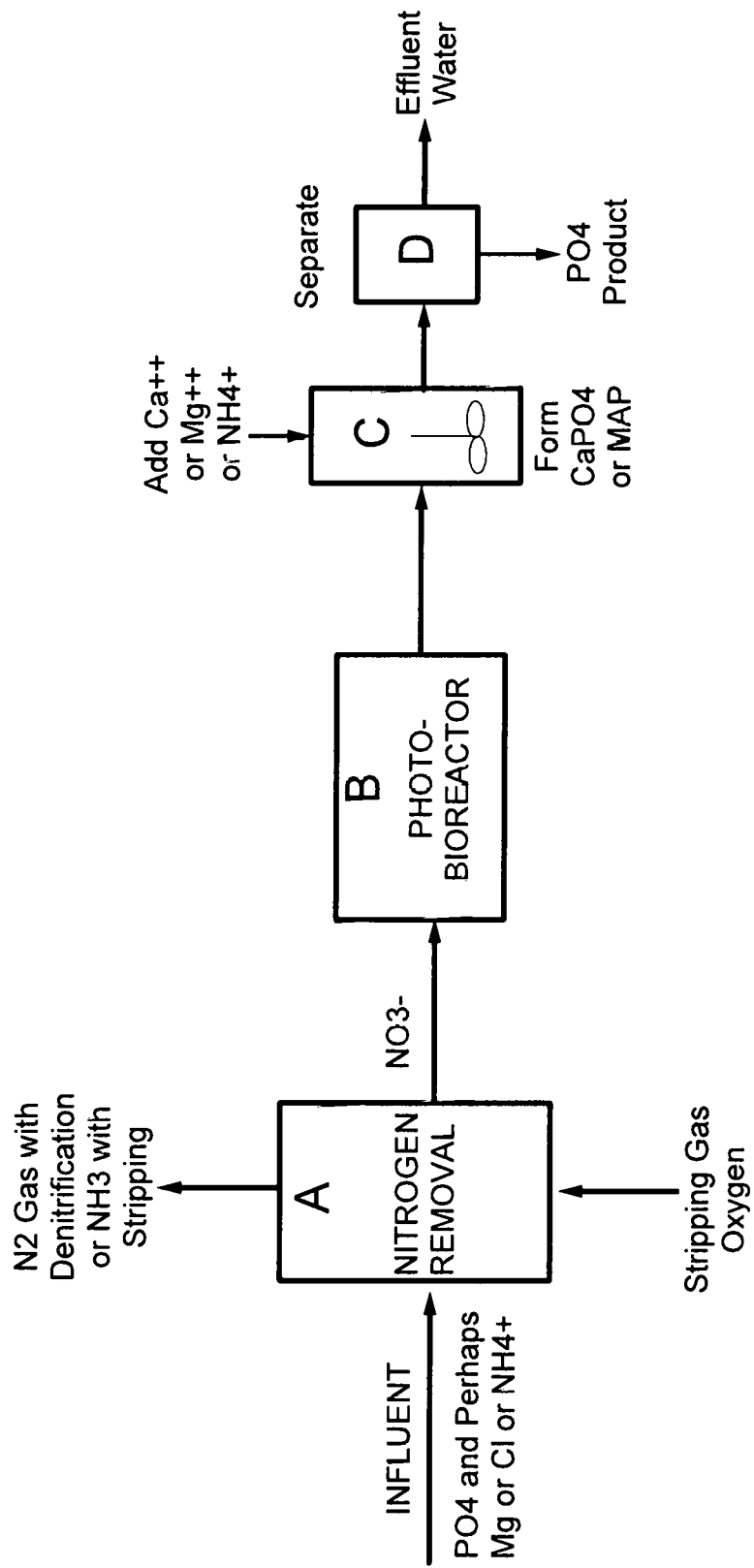
FIG. 3 presents a schematic of the process that includes nitrogen removal.

FIG. 3 presents a typical process for nitrogen removal followed by phosphate recovery. An influent waste stream such as anaerobic digestate containing ammonia, phosphate and metal ions enters a nitrogen processing reactor (A) that can be an ammonia stripping reactor or nitrification, ammonia oxidation, or Anammox® reactor that converts the ammonia or a portion thereof to $N_2$ gas or nitrate ($NO_3^-$). The intent of the selected nitrogen removal process is to reduce the adverse impacts of ammonia nitrogen on the autotrophic organisms in the photobioreactor as well as reducing bicarbonate alkalinity. The process may include ammonia stripping, partial ammonia stripping, ammonia oxidation or nitrification. If nitrification takes place, nitrate will enter the photobioreactor with the phosphate and metal ions. In the photobioreactor (B) the pH will be increased and bicarbonate alkalinity decreased by phototrophic organisms during the day. Under dark conditions nitrification may further reduce the alkalinity. After photobioreactor treatment the effluent enters a separate reactor (C) where calcium chloride or magnesium chloride and perhaps ammonia, if a residual does not exist, are added to produce calcium phosphate or MAP. The configuration of the precipitation reactor can be any of the reactors or crystallizers described by Ferguson and herein.

Figure 4:
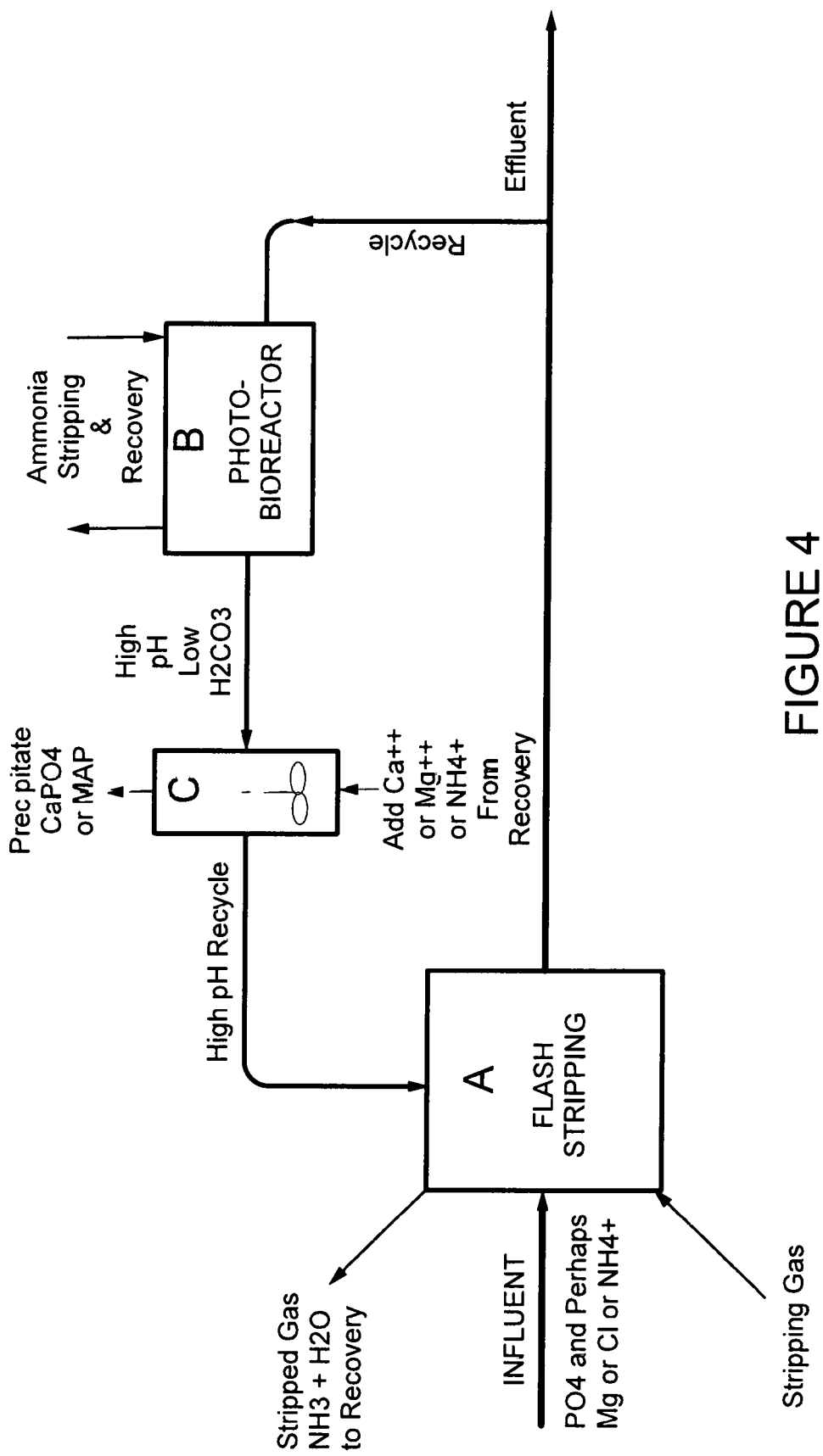
FIG. 4 presents a schematic of an integrated process to remove both nitrogen and phosphate as calcium phosphate.

FIG. 4 presents a schematic of a representative process for the removal and recovery of both ammonia and calcium phosphate. A majority of the ammonia is gas stripped for recovery in a flash stripping unit (A) for the removal of a majority of the nitrogen as desired by the operator through control of the process recycle rate. A portion of the effluent from the flash stripping unit (A) passes through an ammonia-stripping, photobioreactor (B) and thence through a calcium phosphate precipitation reactor (C). The liquid effluent of the precipitation reactor (C) is received by the stripping unit (A). The recycled effluent_from the phosphate precipitation reactor (C) has high pH and low bicarbonate. The flash stripping unit (A) operates at a higher pH, an average between the pH of the reactor (B) and the influent stream. For example, if $CO_2$ has been removed from the influent stream, the pH will be approximately 8.3. The photobioreactor will have a pH of approximately 9.2, which will be reduced slightly when passing through the phosphorus removal reactor (C). If the recycle rate is 100%, the average pH in the flash stripping unit (A) will be 8.75, a pH sufficient to remove approximately 75% of the ammonia at digestate temperatures. The temperature of the stripping reactor may be increased to improve stripping. Reactor (A) may also be operated under a vacuum to increase ammonia removal efficiency. The stripping reactor may be any of a number of commonly-used stripping reactors as well as a rotating photobioreactor described in U.S. Pat. Nos. 8,637, 304 and 8,895,279 as well as a sweep gas distillation process[13].

[13] Ammonia removal by sweep gas membrane distillation, Xie et al., Jan. 18, 2009, *Water Research*, 43 (2009) 1693-1699.

Figure 5:
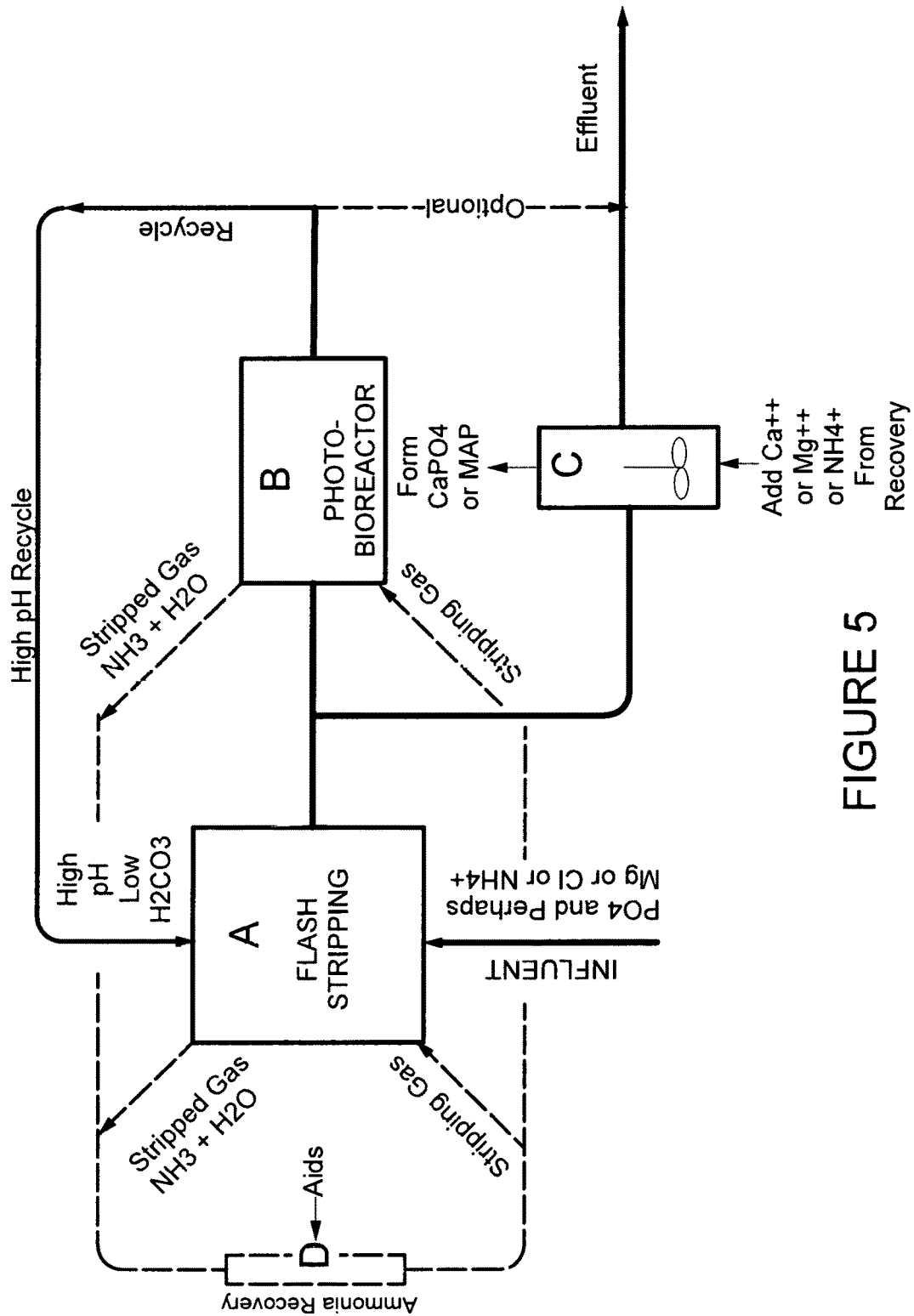
FIG. 5 presents a schematic of an integrated process to remove both nitrogen and phosphate as MAP.

FIG. 5 presents a schematic of a process to remove and recover most of the ammonia and phosphate as MAP. The influent is first delivered to an ammonia flash stripping unit (A) that may be operated at higher temperatures and gas stripping rates. The flash stripping unit (A) also receives a recycle flow from the photobioreactor (B) that has a substantially higher pH and reduced alkalinity. The blended contents of the flash stripping unit (A) will have a lower alkalinity, higher temperature, pH, and perhaps stripping gas flow rate, the conditions necessary for rapid removal of ammonia gas. It is expected that at least 60% of the ammonia will be removed by the flash stripping unit. The effluent from the flash stripping unit (A) is recycled to a photobioreactor (B) that will further increase the pH and by gas stripping remove the remaining ammonia gas. The effluent from the photobioreactor (B) is recycled to the flash stripping unit (A). A portion of the effluent from the gas stripping unit (A) is delivered to a phosphate reclamation reactor (C) where magnesium ions are added to precipitate flocculated or crystallized MAP or KAP. The residual ammonia from the recycle stream (A-B) should be sufficient to create MAP in the presence of magnesium ions. If a proper recycle ratio is chosen, substantially all of the ammonia and phosphate will be removed as MAP or KAP.

As depicted in FIG. 4, the ammonia in the stripping gas may be recovered in an ammonia recovery unit of a kind described previously by Burke, U.S. Pat. Nos. 8,637,304 and 8,895,279. The ammonia gas water vapor may simply be condensed or condensed in the presence of $CO_2$ or other agents as described previously by Burke, U.S. patent application Ser. No. 13/506,249[14]. The ammonia recovery (D) will produce various ammonia products such as ammonium hydroxide, concentrated ammonium hydroxide or ammonium bicarbonate or ammonia-acid-precipitated compounds such as ammonium sulfate. A portion of the recovered ammonia may be used to meet the ammonia concentration requirements for MAP precipitation in reactor C.

[14] "Ammonium Bicarbonate Fiber Explosion Process," U.S. patent application Ser. No. 13/506,249, filed on Nov. 7, 2012.

Figure 8:
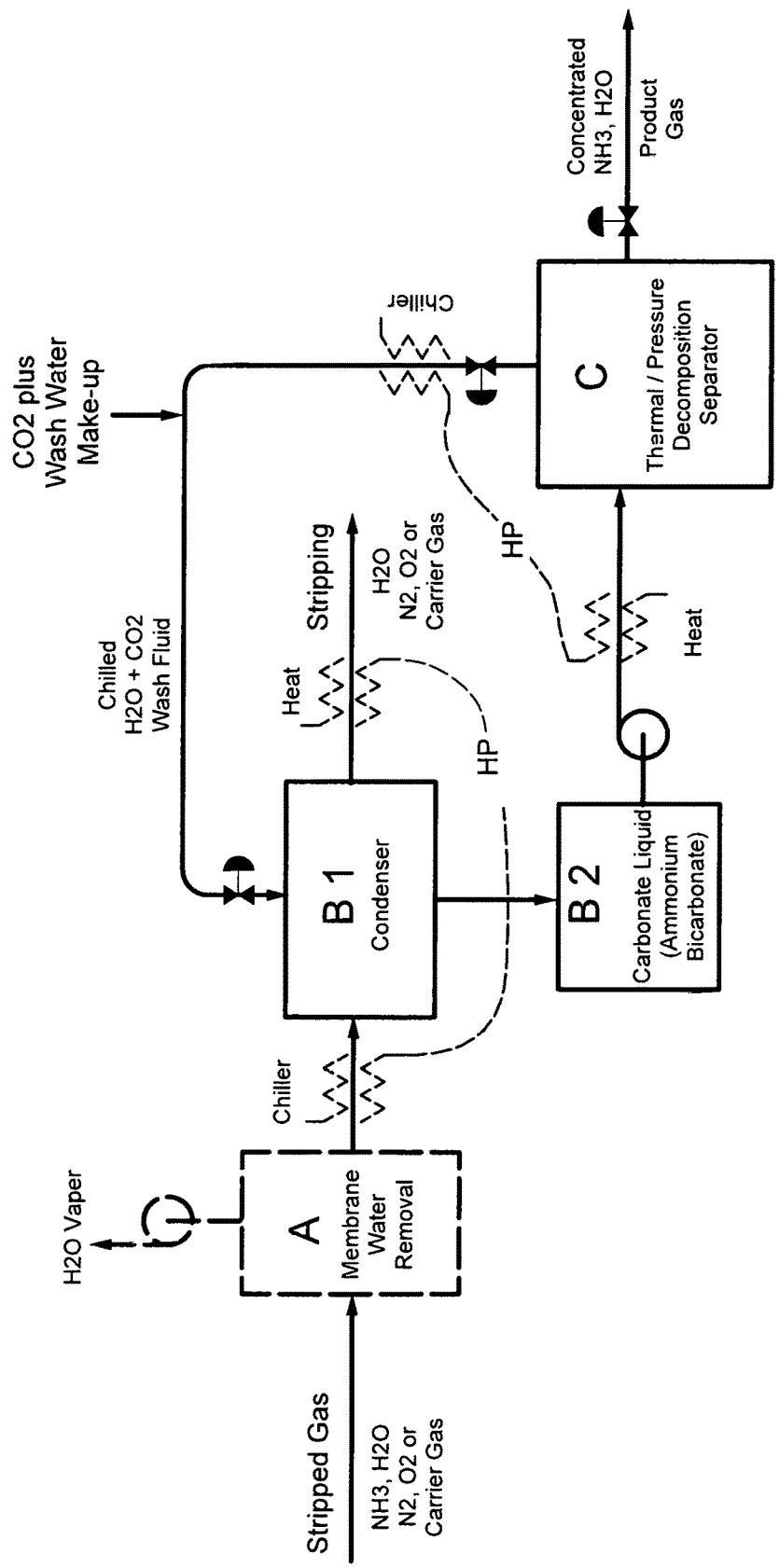
FIG. 8 presents a process for concentrating the stripped ammonia for reuse or other productive purpose.

Alternatively, the stripped gas (FIGS. 4, 5) may be used to produce a concentrated ammonia product. FIG. 8 illustrates such a process. As previously discussed, reclaiming phosphorus utilizing a biological process will more often than not involve the removal and or reclamation of ammonia nitrogen. The value of the recovered ammonia nitrogen is directly proportional to the concentration of the product. FIG. 8 presents the process of condensation of ammonia, water, and carrier stripping gas for the production of a highly concentrated ammonia gas or ammonium hydroxide product that can be used to remove carbon dioxide from biogas, pretreat biomass, produce selective catalytic reduction (SCR) fluid, or produce ammonium carbonate/bicarbonate for the ammonium bicarbonate fiber explosion process energy storage, or hydrogen production. After stripping, the carrier gas will contain ammonia gas, water vapor, and perhaps nitrogen and oxygen. The process of concentrating the stripped ammonia consists of optionally removing water through a membrane separation system (A) followed by condensing the remaining water vapor and ammonia gases in a condenser (B1) to produce an ammonia-rich condensate. Typically, chilled condensate is used to wash ammonia and water vapor from the stripping gas in the condenser. But, that process will rarely produce concentrations exceeding 2% ammonia. The process can be improved by dissolving carbon dioxide in the chilled wash fluid, thereby producing a weak carbonic acid that will more effectively concentrate the ammonia gas. The ammonium carbonate/bicarbonate solution that forms in vessel (B2) can then be decomposed in a heated pressure vessel (C) that will, upon release of the pressure, preferentially release concentrated ammonia gas in accordance with Graham's Law. The lower molecular weight of ammonia (MW=17) means that ammonia will escape solution at a significantly higher rate than carbon dioxide (MW=44). The ammonia gas can then be collected separately from the carbon dioxide to produce ammonium hydroxide. Some or all of the carrier gas is recycled from the heated pressure vessel (C) through the condenser (B1).

In FIG. 8, the stripping gas containing $NH_3$, $H_2O$ and a carrier gas are optionally passed through a water-permeable membrane (A) that removes water vapor under vacuum. The stripping gas then passes through a chiller that reduces the gas temperature. The chiller is followed by a condenser (B1)

where the gas is cooled and washed by a low-pH carbonic acid wash fluid. The ammonium bicarbonate wash fluid (B2) is then pumped through a heat exchanger under pressure to a thermal pressure decomposition separator (C) where the dissolved ammonium bicarbonate/carbonate is decomposed to $CO_2$ and $NH_3$. Upon release of pressure, the ammonia gas is recovered and compressed while the wash fluid is cooled and recirculated to the condenser (B1). The chilling and heating are preferably performed by a heat pump.

In another embodiment of the present invention, during preconditioning (e.g., FIG. 1, suspended solids removal), solids are separated from anaerobically digested liquid waste using a solids, liquid, gas separator similar to that disclosed in Burke's U.S. Pat. No. 6,893,572. Bias, et al., in U.S. Pat. No. 8,404,121 duplicated and used the same vessel. FIG. 3 of Burke's U.S. Pat. No. 6,893,572 is presented herein in FIG. 6 as prior art. Claim 26 of Burke's U.S. Pat. No. 6,893,572 stated in relevant part: "The method . . . further comprising passing digested liquid of step (a) through a liquid/solids separator prior to step (b) and passing a purge gas through the liquid solids separator, thereby producing a carbon dioxide enriched gaseous effluent from said liquid/solids separator." As shown in FIG. 6, digestate or a liquid containing suspended solids, ammonia, and $CO_2$ enters a separator. Gas from a blower or compressor is also introduced into the separator, below the digestate influent, to supplement the gas necessary for flotation. At the same time, a vacuum pump removes a $CO_2$-enriched gas and a gas deficient in ammonia. The effluent liquid having a higher pH and a lower concentration of $CO_2$ continuously exits the separator while the separated solids are intermittently removed. Suspended solids are removed while the pH of the effluent increases to approximately 8.3±. The higher-pH, carbon dioxide-deficient liquid produced by the solids, liquid, gas separation process depicted in FIG. 6 can be used as a preconditioned influent to any of the processes depicted in FIGS. 1 through 5.

FIG. 9 presents an improved version of the process/apparatus described previously by Burke and shown in FIG. 6. It provides for the continuous removal of suspended solids without the difficulties of separating solids using an internal circular weir as described by Bias, et al., in U.S. Pat. No. 8,404,121. It has been repeatedly shown that thickened solids do not flow over a weir plate without mixing dilute water flowing under the float blanket with the thickened solids. The thickened float solids float on the surface of the water, a portion of which floats below the water surface. Consequently the mass of float solids will not float over a weir without accompanying water, resulting in a reduced concentration of concentrate from the separator, which is undesirable. That is why all flotation separators use a scraper and ramp to lift the thickened solids from the flotation separator water surface. The process shown in FIG. 9, however, utilizes Burke's process/apparatus described in U.S. Pat. No. 6,893,572, but supplemented with vacuum flotation that removes dissolved gases that promote flotation of solids within the separator. The process depicted in FIG. 9 also supplements the limited dissolved gas in the liquid influent with sparged gas delivered through fine air diffusers or spargers, with or without a blower or compressor to power the spargers. The float solids are also removed from the top of the flotation separator through a vacuum pipe assembly and thence into a receiver in communication with the inlet side of a vacuum pump. The vacuum pump sucks the solids from the top surface of the liquid influent within the separator into and through the vacuum receiver, which separates the solids from the liquid. Solids can be removed from the surface of the influent liquid in the separator by simply raising and lowering the top surface of the liquid influent within the separator to submerge the solids below the vacuum pipe or pipes for removal. Coagulants can be added to the liquid influent prior to its entering the separator to encourage coagulation of the solids therein. Optionally, the solids can also be removed through a bottom outlet of the separator for cleaning or intermittent solids removal as previously described by Burke. Solids that collect in a bottom portion of the receiver preferably are pumped out by a pump as separated solids. The higher-pH, carbon dioxide-deficient liquid produced by the improved solids, liquid, gas separation process depicted in FIG. 9 can be used as a preconditioned influent to any of the processes depicted in FIGS. 1 through 5.

The foregoing description has been directed to particular embodiments of the method of the present invention in order to comply with the requirements of the United States patent statutes. It will be apparent to those skilled in this art, however, that many modifications and changes in the method and the apparatus for practicing the method will be possible without departing from the spirit and scope of the invention. It is intended that the following claims be interpreted to embrace all such modifications and changes as will be apparent to one having ordinary skill in this technology.

I claim:

1. A process for separating solids, liquid and gases in a liquid influent containing solids and gases, including ammonia and carbon dioxide, comprising the steps of:
    (a) feeding the liquid influent into a separator, said separator having top and bottom portions joined by an intermediate portion;
    (b) maintaining the ammonia as ammonium by maintaining the pH of the liquid influent within the separator at less than about 8.3 and at a selected operating temperature;
    (c) feeding a sparging gas into the bottom and/or intermediate portion of the separator, thereby causing solids within the separator to float in the top portion of the separator as floated solids together with sparging gas, carbon dioxide and influent liquid;
    (d) vacuum suctioning through a vacuum outlet of the separator the floated solids and gases from the top portion of the separator into a receiver; and
    (e) removing from the separator a liquid effluent, said liquid effluent having an elevated pH and lowered carbon dioxide concentration compared to the liquid influent.

2. The process of claim 1, further comprising adding one or more coagulants to the liquid influent prior to step (a).

3. The process of claim 1, further comprising, in step (c) pressurizing the sparging gas with a blower or compressor.

4. The process of claim 1, further comprising removing solids from the separator through a bottom outlet thereof.

5. The process of claim 1, further comprising pumping the solids collected in a bottom portion of the separator therefrom as separated solids.

6. The process of claim 1, wherein the liquid effluent removed from the separator in step (e) of claim 1 is used to remove carbon dioxide, and any toxic gases that may be present, from a nutrient-laden, aqueous liquid containing phosphate, bicarbonate, and ammonia, said liquid having nonzero bicarbonate alkalinity.

7. The process of claim 1, further comprising alternately raising and lowering the liquid level in the separator above and below the vacuum outlet, and thereby remove flotation gas or float solids from the separator, respectively.

* * * * *